United States Patent Office 3,509,058
Patented Apr. 28, 1970

3,509,058
FERROMAGNETIC MATERIALS ON THE BASIS OF NICKEL FERRITE OR NICKEL-ZINC FERRITE
Georges Estival, Argenteuil, Val-d'Oise, and Marc Monneraye, Aubervilliers, Seine-St.-Denis, France, assignors, by mesne assignments, to U.S. Philips Corporation, New York, N.Y., a corporation of Delaware
No Drawing. Filed Aug. 15, 1967, Ser. No. 660,605
Claims priority, application France, Aug. 23, 1966, 73,798
Int. Cl. C04b *35/28, 35/30*
U.S. Cl. 252—62.62                                      2 Claims

ABSTRACT OF THE DISCLOSURE

A nickel-zinc-cobalt-vanadium ferrite suitable for use at frequencies higher than 1 mHz. characterized by a minimum (optimum) value of tan $\delta/\mu$; a minimum value of the temperature factor F of the initial permeability ($\mu$); and insensitivity to magnetic impact effect such that the properties of the material as a whole are not substantially affected in an irreversible manner by the action of a strong constant or a demagnetizing alternating magnetic field. In addition to including small but significant amounts of cobalt and vanadium oxides, the iron oxide ($Fe_2O_3$) content does not exceed 50 mol. percent.

---

This invention relates to ferromagnetic materials on the basis of nickel ferrite or nickel-zinc ferrite.

It is known that certain representatives of these classes of materials are very suitable for manufacturing magnetic cores used at high frequencies, more particularly frequencies higher than 1 mHz. It is important that the initial permeability $\mu_i$ of these cores should vary with temperature to the least possible extent in the range between 20° C. and 70° C. or at least between 20° C. and 55° C. In connection therewith it has previously been suggested to decrease the temperature factor of the initial permeability in the said range of temperatures by adding to the relevant ferrites small amounts, for example, from 0.4 to 4.0 mol. percent of cobalt oxide CoO (see French patent specification No. 1,185,406).

The temperature factor F of the initial permeability is a magnitude which is obtained by dividing the temperature coefficient $T_c$ of the initial permeability ($\mu_i$) by this permeability, that is to say $$F = \frac{T_c}{\mu_i} = \frac{\Delta\mu_i}{\mu_i^2(t_2-t_1)}$$

In this formula $\Delta\mu_i$ represents the difference between the values for the initial permeability as measured at the respective temperatures $t_1$ and $t_2$, the value for the initial permeability, measured at 20° C., being indicated by $\mu_i$.

It is also known to diminish the value for the loss factor (tan $\delta$) by adding small amounts of vanadium oxide to mixed ferrites of nickel and zinc. French patent specification No. 1,049,318, first addition No. 63,640, mentions for example ferrites of the following composition:

|  | Mol. percent |
|---|---|
| $Fe_2O_3$ | 47–49 |
| NiO | 18.25–28.75 |
| ZnO | 24–32 |
| $V_2O_5$ | 0.25–0.75 |

Mixed ferrites according to the invention are distinguished by the following combination of favourable properties:

(1) A minimum, and hence optimum, value for the quotient tan $\delta/\mu_i$ of the initial permeability and the loss factor in a maximum range of frequencies;

(2) A minimum value for the temperature factor F of the initial permeability, while the value of the differential quotient $d\mu_i/dT$ does not vary its sign in the temperature range considered;

(3) Insensitivity to "magnetic impact effect" such that the properties of the material as a whole are not substantially affected in an irreversible manner by the action of a strong constant magnetic field or a demagnetising alternating magnetic field.

Ferrites according to the invention have a composition located within the range of compositions which is characterized by the following relative amounts of the constitutive metal oxides:

|  | Mol. percent |
|---|---|
| $Fe_2O_3$ | 48–50 |
| NiO | 22–49 |
| ZnO | 0–27 |
| CoO | 0.7–1.5 |
| $V_2O_5$ | 0.1–0.5 |

Special attention is drawn to the fact that the content of ferric oxide, $Fe_2O_3$, must at any rate not be higher than 50 mol. percent and preferably even not higher than 49.8 mol. percent. It is also mentioned that for comparatively low values of the molecular ratio NiO:ZnO a fairly high content of ferric oxide, $Fe_2O_3$, within the specified range of concentrations is advantageous. If, for example, the value of the molecular ratio NiO:ZnO is approximately 1 to 3, the optimum content of the ferric oxide lies at approximately 49.4 to 49.9 mol. percent. If the value of the molecular ratio NiO:ZnO is comparatively high, the content of the ferric oxide within the specified range of concentrations is less critical.

The manufacture of materials according to the invention is, broadly speaking, similar to that which is commonly used for known nickel ferrites and nickel-zinc ferrites. Consequently, a mixture of compounds of iron, nickel, cobalt, vanadium and possibly zinc (oxides of these metals and/or compounds which can change to the corresponding metal oxides at the sintering temperature) is sintered at a temperature between 1,000° C. and 1,400° C., it being possible for the said compounds to be replaced wholly or in part by reaction products of two or more of said metal oxides which have been previously formed.

Table II indicates the values for the initial permeability, those for tan $\delta/\mu_i$, hence for the quotient of the loss factor and the initial permeability, and those for the temperature factor F of the initial permeability for a series of materials 1 to 14, the chemical compositions of which are specified in Table I.

The electromagnetic losses have invariably been measured on toroidal magnetic cores each surrounded by a coil having a number of turns depending on frequency. No correction was made for the losses occurring in the coil itself, so that the loss values specified in Table II are greater than those of the ferrite bodies concerned.

TABLE I

| Material | $Fe_2O_3$ | NiO | ZnO | CoO | $V_2O_5$ | Molecular ratio NiO:ZnO |
|---|---|---|---|---|---|---|
| 1 | 49.7 | 35.8 | 14.5 | | | 2.5 |
| 2 | 49.3 | 35.45 | 14.35 | 0.9 | | 2.5 |
| 3 | 49.3 | 35.3 | 14.3 | 0.9 | 0.20 | 2.5 |
| 4 | 49.3 | 35.3 | 14.3 | 0.9 | 0.20 | 2.5 |
| 5 | 51.7 | 33.7 | 13.5 | 0.9 | 0.20 | 2.5 |
| 6 | 54.4 | 31.8 | 12.7 | 0.9 | 0.20 | 2.5 |
| 7 | 49.7 | 22.8 | 26.1 | 1.2 | 0.20 | 0.9 |
| 8 | 49.7 | 31.95 | 16.9 | 1.25 | 0.20 | 1.9 |
| 9 | 49.2 | 30.0 | 19.3 | 1.25 | 0.25 | 1.55 |
| 10 | 48.65 | 45.9 | 3.85 | 1.3 | 0.3 | 12 |
| 11 | 49.3 | 45.1 | 4.3 | 1.0 | 0.3 | 10.5 |
| 12 | 49.2 | 45.05 | 4.2 | 1.25 | 0.3 | 11 |
| 13 | 50.04 | 44.38 | 4.35 | 0.98 | 0.25 | 10 |
| 14 | 50.04 | 44.38 | 4.35 | 0.98 | 0.25 | 10 |

TABLE II

| Material | $\mu_i$ | $\frac{\tan \delta}{\mu_i} \times 10^6$ at a frequency (in mHz.) of— | | | | | | | | | $F \times 10^6$ in the temperature range between— | | |
|---|---|---|---|---|---|---|---|---|---|---|---|---|---|
| | | 1.5 | 2 | 5 | 10 | 15 | 20 | 30 | 40 | 50 | 20 and 70° C. | 20 and 60° C. | 20 and 55° C. |
| 1 | 71 | | 180 | 190 | 250 | 505 | 1,170 | | | | +35 | | |
| 2 | 73 | | 171 | 201 | 274 | 490 | 1,140 | | | | +14 | | |
| 3 | 79 | | 52 | 63 | 97 | 195 | 575 | | | | +13 | | |
| 4 | 73 | | 58 | 67 | 88 | 120 | 202 | | | | | | |
| 5 | 70 | | 63 | 70 | 88 | 105 | 135 | | | | | | |
| 6 | 50 | | 87 | 92 | 105 | 125 | 138 | | | | | | |
| 7 | 295 | 40 | 43 | 190 | | | | | | | +4 | | |
| 8 | 102 | | 35 | 47 | 74 | 185 | 720 | | | | +5 | | +3 |
| 9 | 63 | | 79 | 91 | 105 | 115 | 132 | 200 | | 790 | | | +73 |
| 10 | 24 | | | | | | 238 | 251 | 323 | 578 | | | +14 |
| 11 | 23 | | | | | | 230 | 279 | 385 | | | | +18 |
| 12 | 25 | | | | | | 200 | 240 | 290 | 450 | | 0 | |
| 13 | 20 | | | | 200 | 210 | 230 | 252 | 280 | | | | |
| 14 | 30 | | | | 140 | 173 | 205 | 270 | 490 | | | | |

The material 1 is a mixed ferrite of nickel and zinc having a small "shortage of iron" (that is to say an iron content lower than equivalent to 50 mol. percent of $Fe_2O_3$). Including 0.9 mol. percent of CoO in this material yields the material 2 of which the initial permeability and the loss factors at the various measuring frequencies are approximately equal to the corresponding values of the material 1, but of which the temperature factor F of the initial permeability $\mu_i$ between 20° C. and 70° C. is distinctly lower and hence better. Including in the material 2 a small amount (0.30% by weight) of $V_2O_5$, which is added as such or in the form of ammonium vanadate to either the initial mixture or the ground presintered product, yields the material 3 of which all the magnetic properties which are important in the present connection are distinctly superior to the corresponding properties of the material 1.

In order to demonstrate that the resistivity against "magnetic impact effect" is intimately connected with the iron content chosen, three different materials were manufactured having the same molecular ratios NiO:ZnO, CoO contents and $V_2O_5$ contents, but two materials of which have higher iron contents than correspond to 50 mol. percent of $Fe_2O_3$.

The three materials concerned were subjected to the action of a magnetic constant field having a strength of four times the coercive force of the material concerned. Magnetic cores which, prior to magnetisation, differed in loss values to the least possible extent were compared with one another. The "magnetic impact effect" was obtained by subjecting the relevant magnetic cores to the action of a magnetic constant field of 20 oersteds for 5 minutes.

Table III shows the influence of the "magnetic impact effect" on the materials 4, 5 and 6, the material 4 having a chemical composition similar to that of the material 3, but which was manufactured by a slightly different method, while the iron contents of the materials 5 and 6, as shown in Table I, are higher than that corresponding to 50 mol. percent of $Fe_2O_3$.

are hardly affected thereby. The insensitivity to magnetic impact effect resulting from the selected iron content is retained if the ratio NaO:ZnO is caused to vary. See, for example, Table IV given hereinafter for the material 7 of Table I (NiO:ZnO=0.9), which was subjected to the action of a magnetic constant field of 12 oersteds for 10 minutes.

TABLE IV

| $\frac{\tan \delta}{\mu_i} \times 10^6$, at— | Prior to the magnetic impact treatment | After the magnetic impact treatment |
|---|---|---|
| 1.5 mHz. | 40 | 42.5 |
| 2 mHz. | 43 | 45 |

From these figures it appears that the material 7 is also highly resistant to "magnetic impact effect." The same is true of the material 8 of Table I (NiO:ZnO=1.9) as may be seen from Table V which relates to the manner in which this material reacts to a magnetic impact treatment by means of a magnetic constant field of 25 oersteds for 10 minutes.

TABLE V

| $\frac{\tan \delta}{\mu_i} \times 10^6$, at— | Prior to the magnetic impact treatment | After the magnetic impact treatment |
|---|---|---|
| 2 mHz. | 35 | 38 |
| 5 mHz. | 47 | 46 |
| 10 mHz. | 74 | 71 |
| 15 mHz. | 185 | 160 |

Similar results are obtained with materials having comparatively high values for the molecular ratio NiO:ZnO. Table VI relates to the material 11 of Table I having a molecular ratio NiO:ZnO of 10.5, which material was subjected to the action of a magnetic constant field of 35 oersteds for 10 minutes.

TABLE VI

| $\frac{\tan \delta}{\mu_i} \times 10^6$, at— | Prior to the magnetic impact treatment | After the magnetic impact treatment |
|---|---|---|
| 30 mHz. | 230 | 225 |
| 40 mHz. | 279 | 295 |
| 50 mHz. | 385 | 392 |

TABLE III

| Material | $\mu_i$ | $\frac{\tan \delta}{\mu_i} \times 10^6$ at a frequency (in mc./s.) of— | | | | | | | | |
|---|---|---|---|---|---|---|---|---|---|---|
| | | 2 | | | 10 | | | 20 | | |
| | | Prior to the magnetic impact treatment | After the magnetic impact treatment | Rise in percent | Prior to the magnetic impact treatment | After the magnetic impact treatment | Rise in percent | Prior to the magnetic impact treatment | After the magnetic impact treatment | Rise in percent |
| 4 | 73 | 58 | 58 | 0 | 88 | 91 | 3 | 202 | 229 | 13 |
| 5 | 70 | 63 | 82 | 30 | 88 | 124 | 41 | 135 | 529 | 292 |
| 6 | 50 | 87 | 114 | 31 | 105 | 140 | 33 | 138 | 286 | 107 |

As will be apparent from Table III, the loss factors of the materials 5 and 6 are very sensitive to the magnetic impact treatment, whereas those of the material 4

The lower limit of the iron content is determined by the influence of this content on the temperature factor. Thus the material 9 of Table I ($Fe_2O_3$=49.2 mol. percent) has a temperature factor F of the initial permeability of $73\times10^{-6}$ between 20° C. and 55° C. A material is concerned having a molecular ratio NiO:ZnO of 1.55, which is a comparatively low value. As previously mentioned, the iron content is less critical for a comparatively high value of the molecular ratio NiO:ZnO. Thus, for example, the materials 10, 11 and 12 of Table I (molecular ratios NiO:ZnO of 10.5 to 12), are all of good quality on the standards used in this connection, although the iron content expressed in mol. percent of $Fe_2O_3$ varies between 48.6 and 49.3. By the way it is mentioned that for the material 12, in order to achieve a temperature factor F of approximately zero between 20° C. and 60° C., a change of sign of the differential quotient $d\mu/dT$ in this temperature range had to be taken into the bargain by way of exception. This shows again that the effect resulting from the combination of a shortage of iron and an addition of small amounts of cobalt oxide and vanadium oxide invariably occurs, irrespective of the value for the molecular ratio NiO:ZnO (at least insofar this value is not lower than approximately 0.8).

The materials 13 and 14 of Table I have, as the previously mentioned materials 5 and 6 of this table, iron contents equivalent to more than 50 mol. percent of $Fe_2O_3$. Although their chemical compositions do not differ, these materials have different values for the initial permeability because the temperature treatment used for the manufacture of the one material differed slightly from that used for the manufacture of the other material. However, due to both materials including an excess of iron (and hence their iron contents being higher than correspond to 50 mol. percent of $Fe_2O_3$) both are also distinctly sensitive to magnetic impact effect, as may appear from Table VII following hereinafter.

TABLE VII

| Material | $\mu_i$ | $\frac{\tan\delta}{\mu_i}\times 10^6$ at a frequency (in mHz.) of— | | | | | |
|---|---|---|---|---|---|---|---|
| | | 30 | | | 40 | | |
| | | Prior to the magnetic impact treatment | After the magnetic impact treatment | Rise in percent | Prior to the magnetic impact treatment | After the magnetic impact treatment | Rise in percent |
| 13 | 20 | 252 | 280 | 11 | 280 | 361 | 29 |
| 14 | 30 | 270 | 375 | 39 | 490 | 845 | 72 |

In conclusion it is to be noted that nickel-(zinc)-cobalt-vanadium ferrites have been described in British patent specification No. 911,795. However, all these known ferrites include an excess of iron to an extent such that the iron content expressed in mol. percent of $Fe_2O_3$ is even higher than 50.5.

What is claimed is:

1. A material for magnetic cores suitable for use at frequencies higher than 1 mHz., and insensitive to magnetic impact effect consisting of a mixed ferrite having a composition, expressed in contents of metal oxides, of

| | Mol. percent |
|---|---|
| $Fe_2O_3$ | 48–50 |
| NiO | 22–49 |
| ZnO | 0–27 |
| CoO | 0.7–1.5 |
| $V_2O_5$ | 0.1–0.5 |

2. A material for magnetic cores as claimed in claim 1 wherein the $Fe_2O_3$ content is 49.2 to 49.8 mol. percent.

References Cited

UNITED STATES PATENTS 2,736,708  2/1956  Crowley et al. ____ 252—62.56
2,744,873  5/1956  Piekarski _____ 252—62.62

TOBIAS E. LEVOW, Primary Examiner

R. D. EDMONDS, Assistant Examiner

U.S. Cl. X.R.

252—62.56